Figure 1:
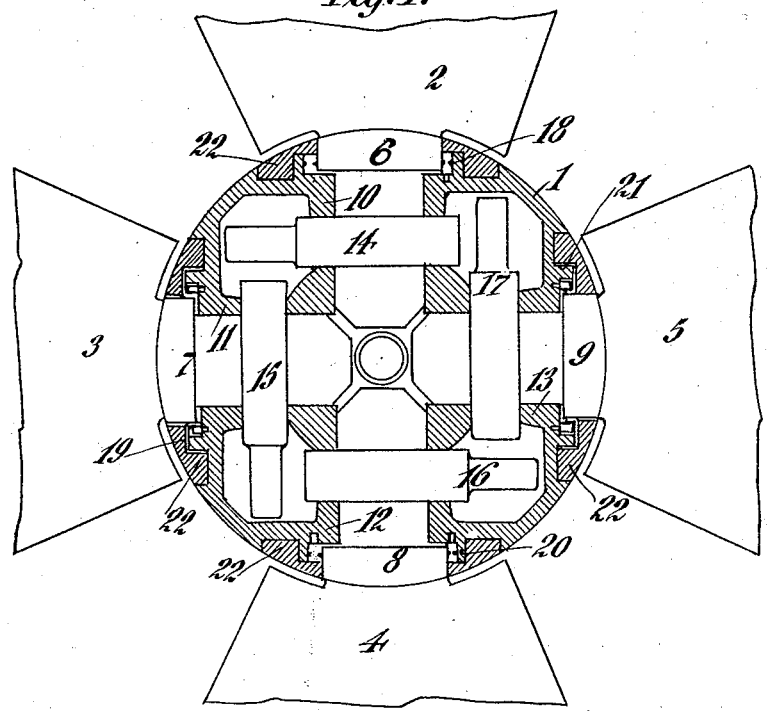

July 12, 1932.  C. SCHMITTHENNER  1,866,580
SEALING DEVICE
Filed Dec. 23, 1929  2 Sheets-Sheet 1

INVENTOR
Carlos Schmitthenner
BY C. L. Treper
his ATTORNEY.

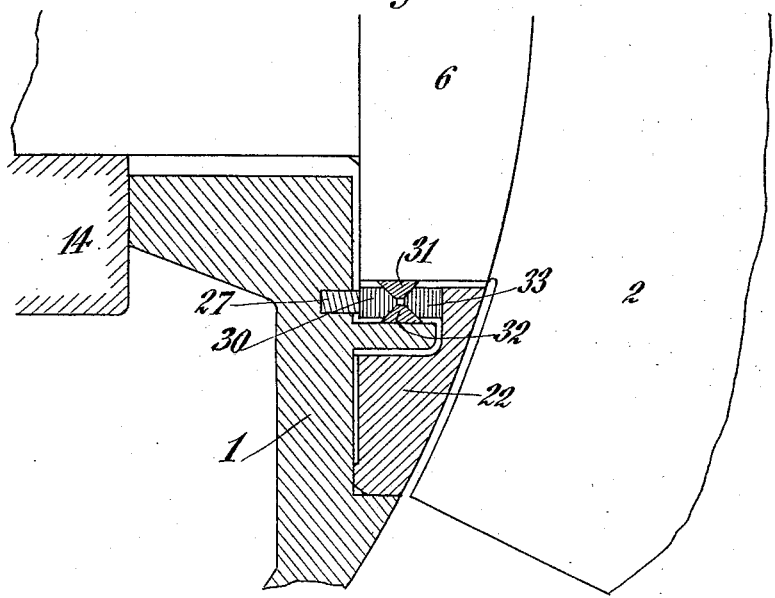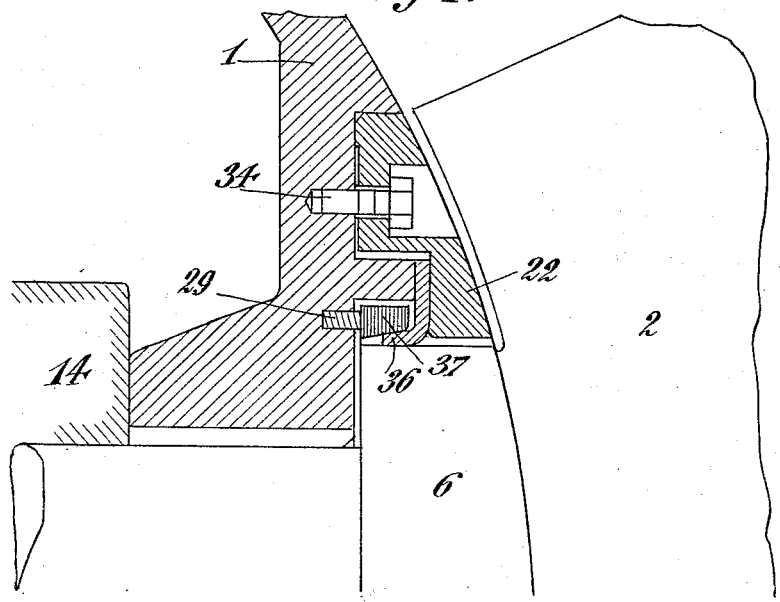

Patented July 12, 1932

1,866,580

UNITED STATES PATENT OFFICE

CARLOS SCHMITTHENNER, OF HEIDENHEIM ON THE BRENZ, GERMANY, ASSIGNOR TO AMERICAN VOITH CONTACT COMPANY, INCORPORATED, OF NEW YORK, N. Y., A CORPORATION OF NEW YORK

SEALING DEVICE

Application filed December 23, 1929, Serial No. 415,992, and in Germany December 24, 1928.

The gearing for moving the runner blades arranged inside of the hub of turbine wheels with movable runner blades requires a careful lubrication. To this effect the boss generally is filled completely with oil. In order to prevent on the one hand this oil from escaping at the trunnions under the static pressure of the oil quantity extending up into the hollow shaft and under the centrifugal pressure, and on the other hand water, sand or other impurities from penetrating into the hub, the trunnions at their passage through the wall of the hub must be tightened very carefully.

The seals used up to now for this purpose could only be assembled or interchanged after the runner blade itself had been removed. This of course involves great inconveniences and entails a considerable trouble of service as this work can be done only after dismantling of the runner.

These inconveniences shall be overcome by the present invention. It consists in providing a seal which without dismantling the runner blades can be introduced from outside and removed again. Particularly a guard ring of several pieces is provided outside for closing the clearance around the trunnion of the runner blade which outwards is open and into which at least one seal ring consisting of a flexible material is introduced. This guard ring consists of two or more pieces depending on the available space at the trunnion of the runner blade. If there is enough space, perhaps because the blade at the hub projects only a little over the trunnion, the guard ring may consist only of two parts. If there is only little space so that the split ring cannot be introduced it must be made in several parts of which the parts below the blade are, (measured in the peripheral direction), only so long that after turning of the runner blade they become free and may be removed or introduced. For the packing itself preferably rings of flexible material are used which on one place of their circumference may be cut and, owing to their flexibility, introduced into the packing joint. After the introduction the cut surfaces are glued together again.

The seal ring is fastened by the guard ring. If the guard ring is split the two parts are introduced laterally of the blade and, if required, turned in the joint. If the guard ring consists of several pieces first of all the parts of the guard ring which are on both sides of the runner wheel blade are secured by screws. After that the runner wheel blade is turned into another position so that the clearances between the already introduced parts of the guard ring become free; to these places the short pieces of the ring are fastened. The seal ring itself may be held fast also by a split intermediate ring over which the guard ring of several parts is arranged.

My present improvements are illustrated as embodied in a turbine of the type which is generally and commercially known as the Kaplan water turbine or wheel.

The drawings show two examples of the invention.

Figure 2:
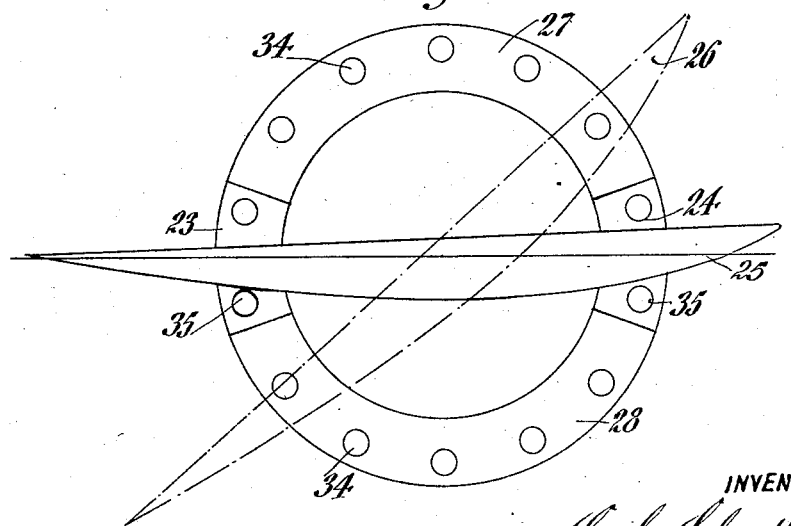

Fig. 1 shows a cross sectional view through the runner hub of a turbine constructed in accordance with the invention, this view being taken on a plane substantially vertical to the axis of the hub; Fig. 2 shows an outside view of the seal seen in the direction of the axis of the trunnion using a guard ring of four parts; and Figs. 3 and 4 show two special designs of the seal itself on an enlarged scale.

Hub (1) carries the four runner blades (2), (3), (4) and (5), which, with their trunnions (6), (7), (8) and (9), are supported by the bearings (10), (11), (12) and (13). Upon the trunnions are arranged levers (14), (15), (16) and (17), upon which acts the gearing for turning the runner blades. According to the invention the trunnions at their outlet from the runner hub are tightened by the outwardly removable seals (18), (19), (20), (21); (18) and (20) represent seals of the packing method shown in detail by Fig. 4, (19) and (21) seals as per Fig. 4. The form of the guard ring (22) is shown by Fig. 2. This ring in the examples shown consists of two smaller parts (23) and (24) which in a certain position of the runner blades are below the blade. In this position the blade in Fig. 2 is marked with (25). If the blades are turned they reach the position (26) shown in dash lines by Fig. 2, in which the blades do not cover parts (23) and (24). Therefore in this position it is possible to assemble or to remove parts (23) and (24). The further circumference of the guard ring, at least, consists of two parts (27) and (28) which in position (25) of the runner blades are free and may be assembled or removed. If the seal itself is formed as per Fig. 3 compression springs (29) are arranged in spacings of hub (1), supported by a solid ring (30). Before the bevelled front edges of this ring are arranged two key rings (31) and (32) of flexible material, for instance leather, which are held fast by another ring (33) of several parts which is overlapped by guard ring (22). At the first assembling of the runner first of all springs (29) which are distributed at the circumference and the solid holding ring (30) are introduced. Thereupon the runner blades are fastened in the hub. Seal rings (31) and (32) preferably are cut only on one place of their circumference and thus may be put around the trunnion owing to the flexibility of their material. The cuttings, if required, may then be glued together. Ring (33) is split and may be introduced in this form on both sides of the blade. Thereupon the parts (27) and (28) of the guard ring, whilst the runner blade is in position (25) (Fig. 2), are fastened by means of screws (34). After that the runner blade is turned into position (26) and parts (23) and (24) are likewise brought into their position and fastened by screws (35).

With the design as per Fig. 4 the seal itself consists of a cupleather ring (36) overlapping ring (37) which on this part holds the compression springs (29). Also in this case ring (37) preferably is made of one piece and brought into its position after the springs (29), but before fastening of the runner blades. The cupleather ring (36) preferably is cut in one place of its circumference and put around the trunnion in such a manner that the cut surfaces can afterwards be glued together. Guard ring (22) has the same form as the one used with Fig. 3.

The execution of the seal itself, of which two examples, a leather wedge—and a cupleather-packing, are shown, still allows many other possibilities. In any case it is characteristic for the object of the invention that the seal can be assembled and removed without dismantling the runner blades.

I claim:

1. Sealing means for use with a turbine wheel having a runner blade with a trunnion turning in a wheel part having an outside face presented to the blade, said sealing means including a seal seated in an annular recess surrounding the trunnion, the outer portion of said recess being open through the outside face and the seal being removable through said portion, an outside annular guard ring detachably secured to the wheel for wedging the seal against the trunnion, and shaped to fit within the outer portion of the recess, said ring composed of separate segments arranged in two pairs the members of each of which are in diametrically opposite relation, to allow the removal of one of the two pairs when the blade is in a position in front of the other of the two pairs.

2. Sealing means for use with a turbine wheel having a hub and a runner blade with a trunnion turning in a bearing in the hub, said sealing means comprising a seat within the hub surrounding the trunnion and facing the blade, a flexible seal in the seat, resilient means wedging the seal against the trunnion, a guard ring detachably secured to the hub, fitting within the seat and coacting with the resilient means in placing the seal under constraint, said ring consisting of separate segments arranged in two pairs the members of each of which are in diametrically opposite relation, to allow the removal of one of the two pairs when the blade is in a position in front of the other of the two pairs.

3. Sealing means for use with a turbine wheel having a hub and a runner blade with a trunnion turning in a bearing in the hub, said sealing means comprising a seat within the hub surrounding the trunnion and facing the blade, a flexible seal in the seat, resilient means and an intermediate ring cooperating to wedge the seal in the seat with the intermediate ring wedged against the trunnion, and a guard ring detachably secured to the hub and fitting within the seat to retain the intermediate ring in place therein and house the same, said ring consisting of separate segments arranged in two pairs the members of each of which are in diametrically opposite relation, to allow the removal of one of the two pairs when the blade is in a position in front of the other of the two pairs.

4. In a turbine wheel hub of the kind having a runner blade with a trunnion accommodated in a bearing and a sealing ring disposed in an annular space within the hub around the trunnion and behind the circle of rotation of the blade, a guard ring for holding the sealing ring in place and shaped to fit thereagainst and within said annular space within the hub and around the trunnion behind the blade, said ring comprising separate segments arranged in diametrically opposite pairs to permit ready removal of a selected pair when the blade is moved in its circle of rotation to a position to one side of the selected pair and in clearance thereof.

5. A turbine wheel having a hub with a bearing therein and an annular recess formed in its outer face, a runner blade with a trunnion operatively mounted in the bearing and surrounded by the recess, a sealing ring disposed in the recess, an anular guard ring for retaining the sealing ring, shaped to fit within said recess and surrounding the trunnion, said guard ring including separate diametrically opposite segments adapted to be applied or removed when the blade is turned in its circle of rotation to a position in clearance thereof, there being face sockets and transverse openings in the segments, and retaining means for the segments having heads received in the sockets and stems adapted to pass through the openings for engagement with the hub.

In testimony whereof I affix my signature.
CARLOS SCHMITTHENNER.